US Patent Office
3,361,909
Patented Jan. 2, 1968

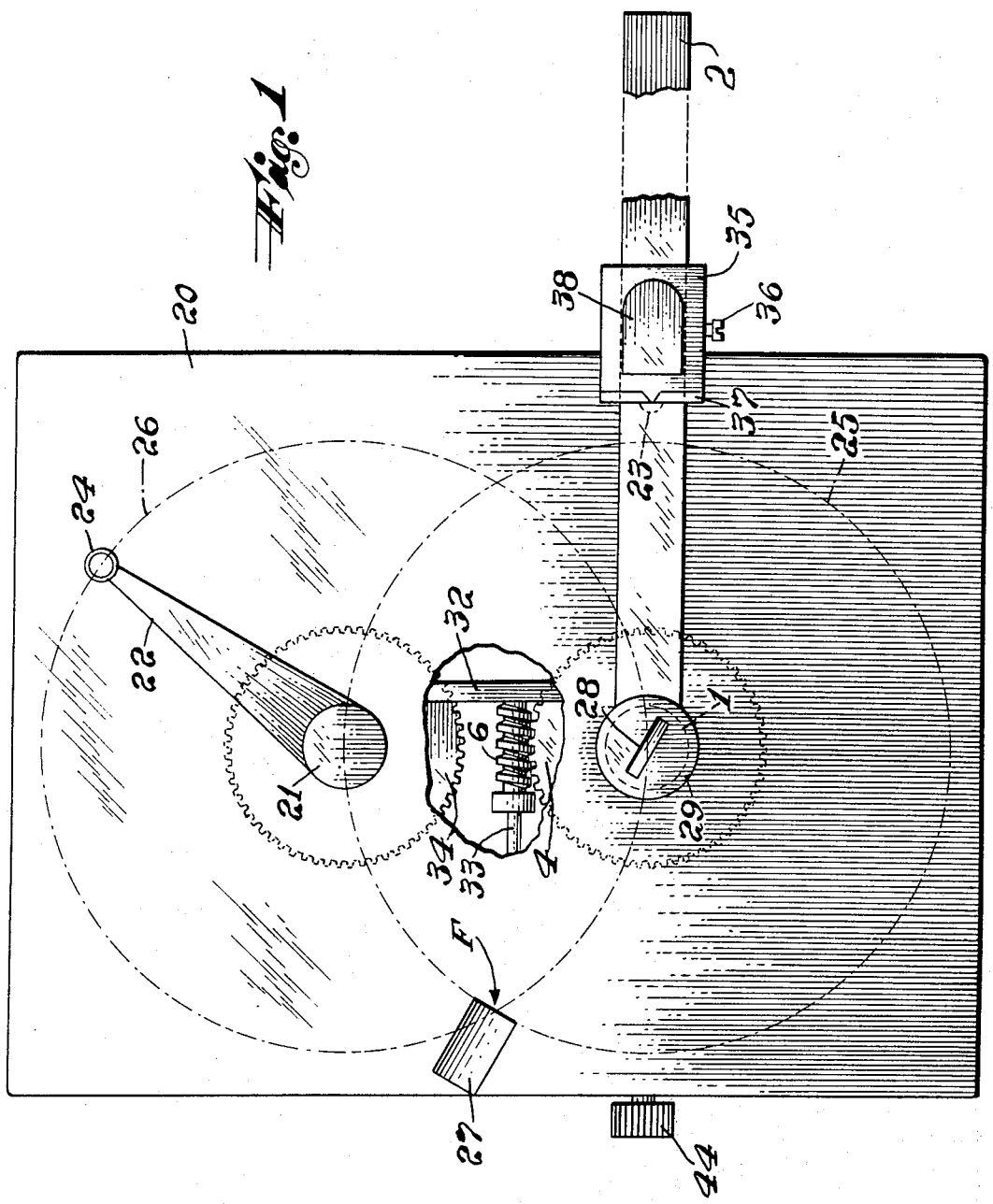

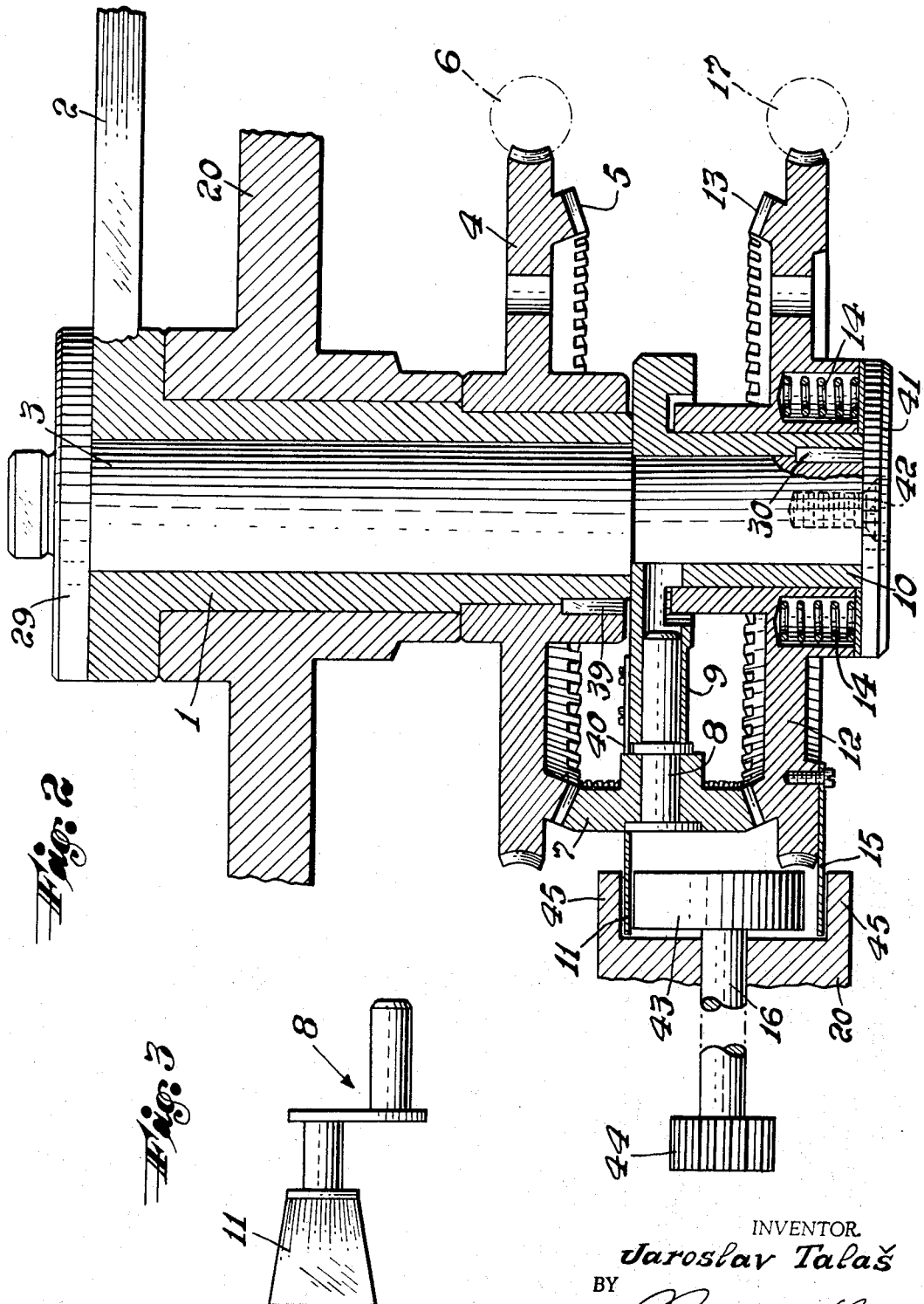

3,361,909
X-RAY DIFFRACTION GONIOMETER WITH SPECIFIC DRIVE MECHANISM FOR THE SPECIMEN HOLDER AND DETECTOR
Jaroslav Talaš, Prague, Czechoslovakia, assignor to Chirana Praha, narodní podnik, Prague, Czechoslovakia
Filed May 21, 1965, Ser. No. 458,517
Claims priority, application Czechoslovakia, May 23, 1964, 2,981/64, 2,982/64
9 Claims. (Cl. 250—51.5)

ABSTRACT OF THE DISCLOSURE

An X-ray analysis apparatus having coaxial shafts respectively carrying a specimen holder and a radial arm slidably supporting a radiation detector, and another shaft carrying another arm. The distance of an eye on the other arm from the axis of the other shaft equals the distance between the axes and the distance between either axis and an X-ray source. The apparatus is a focusing goniometer when the eye engages a pin on the detector and only the other shaft is rotated by a drive mechanism. The apparatus is a diffractometer if the coaxial shafts are rotated at different fixed speeds.

This invention relates to the investigation of the lattice structure of crystalline materials, and particularly to a goniometer in which crystal structure may be determined by analysis of a beam of X-rays diffracted by a sample of the crystalline material investigated.

Among the instruments commonly employed for X-ray analysis of crystal structure are the X-ray diffractometer developed by Bragg and Brentano and the focusing camera of Seemann-Bohlin, and the analogs of the focusing camera in which a radiation sensitive photographic film is replaced by a scanning counter. These two types of instruments perform different methods and furnish different information, and it is sometimes advantageous or even necessary to subject the same specimen or specimens of the same substance to analysis in both types of instrument.

Setting up a specimen and the radiation source in either type of instrument is laborious. When a specimen is to be investigated by both afore-described methods, two setting-up operations are unavoidable in currently available equipment.

The object of this invention is mainly the provision of an instrument which may be operated as an X-ray diffractometer of the Bragg-Brentano type or as a focusing camera of the Seemann-Bohlin type without altering the basic set-up of the specimen and of the radiation source so that diffraction readings may be quickly obtained by both methods with a single setting-up operation.

Many elements of my instrument are basically known. The radiation source may be the focal spot on the target of an X-ray tube or the diaphragm or slit of a monochromator. The crystal specimen is supported on a specimen holder which may be of any suitable conventional type, and performs its usual functions. The intensity of the diffracted beam at various angles is determined by a detector of a type known in itself, such as a Geiger counter equipped with receiving slits.

The adaptability of my instrument to the several analytical methods is due to the spatial arrangement of the basically known elements, and to the drive arrangement which connects them for joint movement or for relative movement.

In one of its more specific aspects, this invention resides in a combination of goniometer elements in which two arms are mounted on a common support for angular movement about respective axes which extend in a common direction. The arms extend radially from the respective associated axes which are spaced from each other a certain distance. A radiation detector is radially slidable on the first arm toward and away from the first axis. The detector and the second arm are equipped with coupling means which may be engaged with each other. The coupling means on the second arm is at a fixed distance from the second axis which is equal to the spacing of the two axes. A specimen holder is rotatable on the support about the afore-mentioned first axis. The source of radiation is mounted on the support and is as far from either axis as the axes are spaced from each other.

The drive mechanism permits the first arm and the specimen holder to be rotated or angularly moved about the first axis at a predetermined ratio between their angular velocities when the coupling means are disengaged. Alternatively, the drive mechanism actuates angular movement of both arms when the coupling means are engaged, while the specimen holder stands still.

In the first mode of operation of the drive mechanism, the apparatus operates as a diffractometer of the Bragg-Brentano type. In the second mode of operation of the drive mechanism, the apparatus performs the functions of a focusing camera of the Seemann-Bohlin type.

In another one of its aspects, the invention resides in a specific drive mechanism for moving the arms and the specimen holder relative to each other as described in the preceding paragraph.

Other features and many of the attendant advantages of this invention will be readily appreciated as the same becomes better understood by reference to the following detailed description when considered in connection with the accompanying drawing in which:

FIG. 1 is a top plan view of a goniometer of the invention, portions of the structure being broken away to reveal internal elements;

FIG. 2 shows a detail of the goniometer of FIG. 1 in elevational section on a larger scale; and FIG. 3 is a plan view of an element of the apparatus of FIG. 2.

Referring now to the drawing in detail, and initially to FIG. 1, there is shown a housing 20 which supports and partly encloses the operating elements of a goniometer of the invention. Two arms 2, 22 are mounted on respective shafts, 1, 21 which are journaled in the housing 20 and whose spaced axes are parallel. The arms are axially offset from each other.

The arm 22 carries an eye 24 at its free end. The spacing of the eye 24 from the axis of the shaft 21, is equal to the spacing of the two axes from each other. The two axes and the eye 24 thus define two circles 25, 26 about the axes. Each circle passes through the center of the other circle.

The effective focus F of an X-ray source 27 is axially aligned with a point of intersection common to the two circles 25, 26. The X-ray source 27 is aimed at a specimen 28 mounted on a specimen holder 29. The specimen holder includes a platform arranged for rotation about the axis of the shaft 1 and may be coupled to the arm 2 for joint rotation as will presently be shown in more detail.

The shafts 1 and 21 carry respective worm wheels 4, 34 which have identical peripheral gear rims and are arranged in a common plane within the housing 20. In the illustrated position of the apparatus, a worm 6 meshes with the wheel 4. The two bearings of the worm 6, not themselves visible in the drawing, are slidably supported in the housing 20 on two respective guide rails 32 of which only one is shown for the sake of clarity. The worm 6 may thus be shifted from the illustrated position into meshing engagement with the worm wheel 34. Rotation of the worm 6 is actuated by its shaft 33 and by a non-illustrated constant-speed motor.

The arm 2 passes through an opening in a slide 35 which is longitudinally movable on the arm 2, and whose position on the arm 2 may be fixed by means of a set screw 36. A slit 37 and a Geiger counter 38 aligned with the slit are mounted on the slide 35. A pin 23 extends downward from the slide 35 in alignment with the slit 37.

FIG. 2 shows the drive mechanism for actuating movement of the arm 2 and of the specimen holder 29 in section on the axis of the shaft 1. The shaft 1 is journaled in a bearing portion of the housing 20. It is hollow and coaxially receives a shaft 3 on which the specimen holder 29 is fixedly mounted. The worm wheel 4 is fixedly fastened on the shaft 1 by a key 39. An integral bevel gear rim 5 projects from the radial bottom face of the gear 4. The worm 6 is shown in phantom view only.

The gear rim 5 meshes with a bevel gear 7 which is freely rotatable on a crank-shaped pin 8 pivotally mounted in a radial projection 9 of a sleeve 10 fixedly fastened to the lower end of the shaft 3 by a key 30. The pin 8, which is shown in more detail in FIG. 3, is normally held in the position illustrated in FIG. 2 by a leaf spring 40 on the projection 9, but is free to pivot on the projection to compensate for minute irregularities of the meshing gears. It carries a sector-shaped blade 11 of friction material of the type employed in brake linings.

A worm wheel 12 similar to the afore-described wheel 4, but equipped with peripheral teeth over a portion of its circumference, is mounted on the sleeve 10. The wheel 12 is freely rotatable thereon about the common axis of the shafts 1 and 3 in the illustrated position of the apparatus and is axially movable on the sleeve 10. A bevel gear rim 13 on the wheel 12 also meshes with the bevel gear 7. The wheel 12 is axially urged toward the gear 7 by helical springs 14 which are mounted in recesses of the wheel 12 and abut against a plate 41 rotatably attached to the shaft 3 by a screw 42.

A blade 15 of friction material projects from the wheel 12 in a radially outward direction. An eccentric braking cam 43 is journaled in the housing 20 by means of a pin 16 one end of which carries the cam and whose other end carries an operating knob 44 which is outside the housing 20. The blades 11 and 15 are interposed between braking cam 43 and projections 45 of the housing 20. As illustrated, the cam 43 is near a position in which it clamps the blade 11 to the corresponding housing projection 45. Rotation of the knob 44 permits the blade 15 to be similarly clamped to the housing 20.

A second worm 17, not visible in FIG. 1, is mounted on the rails 32 for joint movement with the worm 6, and engages the worm wheel 12 when the worm wheel 4 is engaged by the worm 6.

The apparatus illustrated in FIG. 2 operates as follows:

When the braking cam 43 is positioned to engage the blade 15 and thereby to arrest rotation of the worm wheel 12, and the worm 6 is driven by its shaft 33, the hollow shaft 1 is rotated by the worm wheel 4. The movement of the wheel 4 is transmitted to the central shaft 3 by the bevel gear 7 and the pin 8 at one half of the rotary speed of the hollow shaft 1. A specimen supported on the specimen holder 29 thus is rotated about the common axis of the shafts 1, 3 at one half the angular speed at which the arm 2 and the devices supported thereon are turned.

When the braking cam 43 is positioned to engage the blade 11 and thereby to arrest rotation of the shaft 3, and the worm 6 is driven while in engagement with the wheel 4, the arm 2 is pivoted about the common axis of the shafts 1 and 3 while the specimen holder 29 stands still. The worm wheel 12 is simultaneously rotated in the opposite direction by the worm 17. The springs 14 minimize any backlash that may otherwise exist between the meshing elements.

When the worms 6 and 17 are disengaged from the wheels 4, 12, and the cam 43 is positioned to arrest the blade 11 and the specimen holder 29, the arm 2 may be freely rotated. When the worms 6 and 17 engage the respective wheels 4, 12, the cam 43 is positioned to release both blades 11 and 15, the worm 6 is not driven and thereby locks the wheel 4 and the arm 2, and the worm 17 is driven by its non-illustrated shaft in the manner described above with reference to the worm 6, the arm 2 stands still while the specimen holder 29 is rotated.

Referring now to FIG. 1, it will now be set forth how the various modes of operation of the drive mechanism illustrated in FIG. 2 permit the goniometer of the invention to be used as a diffractometer of the known Bragg-Brentano type illustrated in "Elements of X-Ray Diffraction" by B. D. Cullity (Addison-Wesley Publishing Co. Inc., Reading, Mass., 1959, page 179), or as a focusing goniometer of the Seemann-Bohlin type (see Cullity, ibid., page 158).

When it is desired to operate the apparatus of FIG. 1 as a diffractometer, the slide 35 is shifted on the arm 2 until the slit 37 and the pin 23 are axially aligned with the circle 25. The slide 35 is then fixed on the arm 2. The specimen holder 29 is rotated until a line normal to a face of the specimen 28 bisects the arc of the circle 25 between the focus F and the pin 23. The wheel 12 is arrested by turning the knob 44 and the worm 6 is driven in engagement with the wheel 4. The specimen thereby is turned at one half the angular velocity of the counter 38, and a diffraction pattern is produced in a known manner.

When it is desired to operate the apparatus as a focusing goniometer, the specimen 28 is aligned with the X-ray source 27 at the desired angle so that the specimen face is tangential to the circle 26, and the specimen holder 29 is then arrested by means of the knob 44. The slide 35 is released by the set screw 36 so that it may freely move on the arm 2 in a radial direction while maintaining alignment of the slit 37 and the counter 38 with the specimen 28. The worms 6 and 7 are disengaged from the wheels 4, 12, thereby permitting the arms 2, 22 to be turned, and the pin 23 to be engaged with the eye 24 on the arm 22 so as hingedly to connect the arm 22 to the slide 35 and the arm 2. The worm 6 is then meshingly engaged with the worm wheel 34. When the worm is driven, the slit 37 travels along the focusing circle 26. During this travel, the slide 35 moves along the arm 2, and the arm 2 pivots freely as needed.

The angular speeds of the specimen and of the counter are very precisely related at the desired ratio of 1:2 during operation of the apparatus as a diffractometer because the backlash in the gearing is held to a minimum by the springs 24. It is a particularly advantageous feature of the apparatus that the worm wheels 4, 12 and the bevel gear 7 remain engaged in all operative positions of the apparatus, and are urged toward each other by the springs 14.

When a diffraction pattern of the same specimen is to be taken by the Bragg-Brentano method as well as by the Seemann-Bohlin method, the apparatus may be shifted from performing one method to performing the other, the basic positional relationship of the specimen holder and of the X-ray source need not be disturbed. A single adjustment is sufficient for both operations.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. In a goniometer, in combination:
  (a) a support;
  (b) a first arm member and a second arm member mounted on said support for angular movement about respective first and second axes extending in a common direction,
    (1) each arm member extending radially from the associated axis,

(2) said axes being spaced from each other a predetermined radial distance;

(c) X-ray radiation detector means radially slidable on said first arm member toward and away from said first axis;

(d) coupling means on said detector means and on said second arm member, the coupling means on said second arm member being fixedly spaced from said second axis a distance equal to said predetermined distance, and being engageable with the coupling means on said detector means;

(e) a specimen holder mounted on said support for rotation about said first axis;

(f) a source of X-ray radiation mounted on said support and equally spaced from said axes by said predetermined distance; and (g) drive means for angularly moving said first arm member and for simultaneously rotating said specimen holder about said first axis at a fixed ratio between the angular velocities of said first arm member and of said specimen holder when said coupling means on said detector means and on said second arm member are disengaged, and for actuating angular movement of said first and second arm members while said specimen holder is stationary when said coupling means are engaged.

2. In a goniometer as set forth in claim 1, said ratio being one to two.

3. In a goniometer as set forth in claim 1, said detector means including a slit member and a counter member, said members of the detector means being radially aligned on said first arm member.

4. In a goniometer as set forth in claim 1, said coupling means when engaged constituting hinge means pivotally connecting said arm members.

5. In a goniometer as set forth in claim 1, said drive means including two toothed wheels respectively connected with said arm members for joint rotation about said axes, a toothed drive member having an axis and mounted on said support for movement between two positions in which said drive member meshingly engages said toothed wheels respectively, and means for rotating said drive member about said axis thereof while in engagement with either toothed wheel.

6. In a goniometer as set forth in claim 1, said drive means including a hollow first shaft and a second shaft having a portion rotatably received in said hollow shaft, said shafts being mounted on said support for rotation about said first axis, said first arm member being mounted on said first shaft, and said specimen holder being mounted on the second shaft; a first wheel secured against rotation on said first shaft; a second wheel rotatable about said first axis and axially slidable on one of said shafts; respective opposite gear rims on said wheels; a pin member mounted on said second shaft and extending therefrom in a radial direction; a gear member axially interposed between said wheels in simultaneous meshing engagement with said gear rims, said gear member being mounted on said pin member for rotation about an axis extending in said radial direction; yieldably resilient means axially urging said wheels and said gear member toward each other; actuating means engageable with one of said wheel members for actuating rotary movement of the engaged wheel member; and brake means engageable with the other wheel member for selectively arresting rotary movement of said other wheel member.

7. A drive arrangement for an X-ray goniometer comprising, in combination:

(a) first and second coaxial shafts, one of said shafts being hollow, and the other shaft being at least partly received in said hollow shaft for rotation relative thereto about the common axis;

(b) a first wheel member secured against rotation on said first shaft;

(c) a second wheel member axially slidably mounted on the second shaft and rotatable thereon about said common axis;

(d) respective gear rims on said wheel members;

(e) a pin member mounted on said second shaft and extending therefrom in a radial direction;

(f) a gear member mounted on said pin member for rotation about an axis extending in said radial direction, said gear member simultaneously meshing with said gear rims;

(g) yieldably resilient means urging said gear rims into engagement with said gear member;

(h) actuating means for selectively actuating rotation of one of said wheel members about said first axis; and (i) arresting means for arresting rotation of said second wheel member.

8. A drive arrangement as set forth in claim 7, wherein said arresting means include brake means selectively engageable with said pin member and with said second wheel member for selectively arresting rotation of said second wheel member and of said second shaft.

9. A drive arrangement as set forth in claim 7, further comprising means securing said first wheel member on said first shaft against axial movement, said pin member being crank shaped, and having two laterally offset portions, one of said portions being pivotally mounted on said second shaft, and the other portion rotatably carrying said gear member, said gear member moving in the direction of said first axis when said one portion of said pin member pivots on said second shaft.

References Cited

UNITED STATES PATENTS

| 2,648,011 | 7/1953 | Good | 250—51.5 |
| 3,218,458 | 11/1965 | Furnas | 250—51.5 |

WILLIAM F. LINDQUIST, *Primary Examiner.*